US012616170B2

(12) United States Patent
Savage et al.

(10) Patent No.: US 12,616,170 B2
(45) Date of Patent: May 5, 2026

(54) DETERMINATION OF METHANE EMITTED BY RUMINANTS

(71) Applicant: AGRI IOT LIMITED, Kilkenny (IE)

(72) Inventors: Desmond Savage, County Cork (IE); Sean Savage, County Cork (IE)

(73) Assignee: AGRI IOT LIMITED, Kilkenny (IE)

( * ) Notice: Subject to any disclaimer, the term of this patent is extended or adjusted under 35 U.S.C. 154(b) by 572 days.

(21) Appl. No.: 18/018,154

(22) PCT Filed: Jul. 27, 2021

(86) PCT No.: PCT/EP2021/071050
§ 371 (c)(1),
(2) Date: Jan. 26, 2023

(87) PCT Pub. No.: WO2022/023367
PCT Pub. Date: Feb. 3, 2022

(65) Prior Publication Data
US 2024/0172721 A1 May 30, 2024

(30) Foreign Application Priority Data
Jul. 29, 2020 (EP) .................................... 20188403

(51) Int. Cl.
*A01K 11/00* (2006.01)
*A01K 29/00* (2006.01)

(52) U.S. Cl.
CPC .......... *A01K 11/007* (2013.01); *A01K 29/005* (2013.01)

(58) Field of Classification Search
CPC ................ A01K 11/007; A01K 29/005; A61B 2562/0219; A61B 2562/0223;
(Continued)

(56) References Cited

U.S. PATENT DOCUMENTS 5,265,618 A 11/1993 Zimmerman
9,164,081 B2 * 10/2015 Van Der Tol ........ G01N 33/497
(Continued)

FOREIGN PATENT DOCUMENTS

EP 3315965 A1 5/2018
WO WO-2012173502 A1 * 12/2012 ........... A61B 5/7225
(Continued)

OTHER PUBLICATIONS

International Search Report issued in PCT/EP2021/071050; mailed Dec. 8, 2021.

*Primary Examiner* — Omar Casillashernandez
(74) *Attorney, Agent, or Firm* — Studebaker Bracket PLLC

(57) ABSTRACT

Eructations from ruminant animals is measured by use of an electronic bolus in the animals' reticulum, and a host processor which receives sensing data via a communication gateway. The bolus sensors provide physical 3D movement of the bolus in the animal's rumen, specifically ventral sac. By calibration according to general animal phenotypes, group quantitative data for volume of emissions can be determined for periods of time up to the full lifetime of an animal. The processor monitors, according to accelerometer signals, animal body activity to determine in real time periods in which it monitors with increased sensitivity contractions in an animal's rumen. It determines a monitoring period as a period when body activity is below a threshold and also rumination is taking place. It identifies low body activity primarily according to movement of the accelerometer; and identifies rumination according to a pattern of body activity and a condition that it follows immediately after feeding. It monitors rumination primary and secondary contractions during monitoring periods, and
(Continued)

Omasum
Small Intestine
Rumen
Mouth
Oesophagus
Abomasum
Reticulum identifies a secondary contraction as representative of an eructation.

19 Claims, 4 Drawing Sheets

(58) Field of Classification Search
CPC ....... A61B 2562/08; A61B 5/01; A61B 5/036; A61B 2503/40; A61B 5/073; A61B 5/7282; A61B 5/0022; A61B 5/1118; A61B 5/6861; A61B 5/7267
USPC ...................................................... 340/573.3
See application file for complete search history.

(56) References Cited

U.S. PATENT DOCUMENTS 10,517,275 B2 * 12/2019 Harty .................. A61B 5/7246
10,905,100 B2    2/2021 Laporte Uribe
11,191,288 B2 * 12/2021 Duval .................... A23K 20/10
2008/0236500 A1 * 10/2008 Hodges ................ A01K 11/007
                                                                    340/573.3
2009/0182207 A1    7/2009 Riskey et al.
2015/0031963 A1 *  1/2015 Wright ................. A61B 5/6871
                                                                    600/301
2015/0057963 A1 *  2/2015 Zakharov ................. A61B 5/01
                                                                    702/131
2015/0285783 A1   10/2015 Van Der Tol

FOREIGN PATENT DOCUMENTS

| WO | 2013003892 A1 | 1/2013 |
|----|---------------|--------|
| WO | 2019/161397 A1 | 8/2019 |
| WO | 2021030793 A2 | 2/2021 |

* cited by examiner

Omasum

Small Intestine

Mouth

Rumen

Oesophagus

Abomasum

Reticulum

Dorsal sac

Right longitudinal pillar

Dorsal coronary pillar

Caudodoral blind sac

Oesophagus

Caudal pillar

Reticular groove

Cranial sac

Caudoventral blind sac

Cranial pillar

Ventral sac

Electronic Bolus (eBolus)
Setup in an Animal

Eructation Event
Recording

Greenhouse Gas (GHG)
Measurement

DETERMINATION OF METHANE EMITTED BY RUMINANTS

INTRODUCTION

The present invention relates to measurement of greenhouse gases, especially methane, emitted by ruminants such as cattle, camels, and goats.

Ruminants are mammals that chew the cud by regurgitating feed before fully digesting it. Ruminants comprise of cattle, sheep, antelopes, deer, camels, giraffes and their relatives. This process of cud regurgitating is known as rumination, during which the ruminants excrete or belch greenhouse gases, namely, methane ($CH_4$) and carbon dioxide ($CO_2$) as by-products. The emission of $CH_4$ and $CO_2$ impacts negatively on the efficiency of the ruminant to convert the consumed feed source (e.g. grass, grain) into protein (e.g. meat and/or milk) and has detrimental effects on the environment by adding greenhouse gases back into the atmosphere. A cow (example of ruminant) can produce in excess of 600 litres of $CH_4$ per day, by eructations ("belches"). This represents a potential energy loss to the cow of over 10%. By reducing and controlling the eructations from ruminants, farmers can gain efficiencies in food production whilst also reducing the amount of greenhouse gasses produced.

Fermentation in the rumen generates very large quantities of gas, about 30-50 litres per hour in adult cattle. In cattle, eructated gas travels up the esophagus at speeds in excess of 160 cm per second, with an eructation occurring 1 to 3 times per minute depending on the current activity.

U.S. Pat. No. 10,905,100 (Laporte-Uribe) describes monitoring methane ($CH_4$) concentrations during fermentation to deduce an indication of amount of methane produced by an animal, in which dissolved $CH_4$ concentrations can be measured directly with a specific NIRS (near-Infrared spectrometry) sensor and the evolution of methane during the day will give a good indication of the amount of $CH_4$ produced for a certain animal, group of animals and diets.

WO2013/003892 (Wright), describes a method for predicting greenhouse gas emissions for ruminants, the method comprising obtaining data indicative of an amount of at least one gas within the stomach of a ruminant, the data being derived from the output of at least one gas sensor provided by a gas measurement device disposed within the ruminant's stomach; correlating the received data with emitted gas data obtained from one or more respiration chamber readings for the ruminant; and processing the correlated data to predict a greenhouse gas emission for the ruminant.

US2015/0285783 (Lely Patent) describes determining greenhouse gas emissions according to a count of eructations, by way of a sound recorder. WO2021030793 (MIT) describes use of acoustic sensing, in this case in the nasal passageways. EP3315965 (AGRIAL) describes an approach with a muzzle-type device for counting eructations. U.S. Pat. No. 5,265,618 describes using a tracer gas release capsule in the stomach.

It is desirable to find a more effective and reliable solution to accurately estimate the level of greenhouse gases emitted in real time by ruminants. The invention addresses this problem.

SUMMARY OF THE DISCLOSURE

We describe an apparatus for measuring gas emissions from ruminant animals, the apparatus comprising at least one electronic bolus adapted to be internally resident in an animal and to emit sensed data wirelessly and perform local processing within a circuit of the bolus. Each bolus has a housing containing a power supply, at least one sensor including an accelerometer incorporating a gyroscope (hereafter referred to simply as an "accelerometer"), a sensor drive and data capture circuit, and a wireless signal interface for transmitting sensing data. The extent of data transmission depends on the extent of data processing which is performed locally. A gateway is configured to receive sensing data, and a host processor to process received sensing data to accurately estimate emissions data. The host processor is configured to generate an estimate of total gas emitted over a period of time for an individual animal, according to a count of the eructations and characteristics of an animal to estimate the emission rates.

The count of eructations from within the rumen does not require any apparatus or sensing in the region of the head of the animal, only motion signals from an accelerometer in the bolus. An electronic bolus is well known per se, and it is known that an electronic bolus can reside in an animal's rumen without adversely affecting welfare or normal behaviour of the animal. Accelerometers are well known and the invention takes advantage of the extent of information which can be gleaned from an accelerometer in an animal's rumen, and so generate eructation count data without need for invasiveness at the animal's mouth, nose, or breathing tracts.

A particularly advantageous aspect is that the host processor is configured to monitor, according to accelerometer signals, animal body activity to determine in real time periods in which it monitors with increased sensitivity contractions in an animal's rumen. It advantageously determines a monitoring period as a period when body activity is below a threshold and also rumination is taking place. The processor software (local and/or remote) is configured to identify low body activity primarily according to movement of the bolus as sensed by the accelerometer sensor; and to identify rumination according to a pattern of body activity, drinking behaviour, and a condition that it follows immediately after feeding. For example, temperature monitoring may be used to identify drinking activity, by for example the local temperature at the bolus temporarily dropping below normal body temperature due to the water intake. Preferably, the host processor stores characteristics of accelerometer signals for identifying when the animal is feeding, and identifies animal specific body activities as being indicative of feeding behaviour. The accelerometer provides linear acceleration and/or rotational movement of the sensor. It identifies as an event a calculated movement parameter value above a configured threshold. It counts these events in each measuring period, as set out in more detail below.

The processor is preferably configured to monitor rumination primary and secondary contractions during the monitoring periods. Preferably it, in real time, changes the host local processor settings to: (a) increase the sampling rate for the accelerometer signals, and (b) increase the sensitivity of response to the accelerometer signals so that smaller movements than those outside of a monitoring period are sampled and processed.

The processor is advantageously configured to identify a secondary contraction as representative of an eructation. In preferred examples it identifies a secondary contraction on the conditions of (i) there being a determined monitoring period at present, (ii) there being a series of one or more primary contractions and a secondary contraction follows said series, and (c) motion amplitude of the accelerometer is greater for a secondary contraction than for the primary contraction or contractions.

Other aspects are set out below.

We describe an apparatus for measuring gas emissions from ruminant animals, the apparatus comprising:

at least one electronic bolus adapted to be internally resident in an animal and to emit sensed data wirelessly, each bolus comprising a housing containing a power supply, at least one sensor, a sensor drive and data capture circuit, and a wireless signal interface for transmitting the sensing data, a gateway configured to receive the sensing data, and a host processor to process the sensing data to generate emissions data.

Preferably, at least some electronic boluses comprise a plurality of sensors. Preferably, at least some electronic boluses each comprises at least one sensor selected from an accelerometer, a pressure transducer, and a temperature probe. Preferably, the sensing data includes a unique animal identifier.

Preferably, the sensing data includes extent of activity provided by an accelerometer as movement of the bolus within the animal. Preferably, the sensing data includes animal internal rumination system pressure differentials. Preferably, the sensing data includes temperature readings.

Preferably, the host processor is configured to analyse the sensing data according to machine learning (ML) or artificial intelligence (AI) techniques on sensing data recorded in a database. Preferably, the host computer is configured to establish cluster data sets to assist identification of eructation events. Preferably, the host processor is configured to perform the data processing according to a calibration method according to a controlled environment with multiple animals with electronic boluses administered.

Preferably, the host processor is configured to continuously sample number of eructations from the time the electronic bolus is administered to an animal, until time of death or removal from herd, of the animal. Preferably, the host processor is configured to calculate the total gas emitted over a period of time for an individual animal, according to a count of the eructations and characteristics of an animal to estimate the emission rates. Preferably, the host processor is configured to generate gas emissions data according to an assumption that eructations of animals of a particular group are repeatable with a standard volume. Preferably, the host processor is configured to identify said groups according to breed, age and sex of the animal.

We also describe a method of measuring gas emissions from ruminant animals, the method comprising:

at least one electronic bolus internally resident in an animal emitting sensed data wirelessly, a gateway receiving the sensing data, and a host processor processing the sensing data to generate emissions data.

Preferably, at least some electronic boluses each comprises at least one sensor selected from an accelerometer, a pressure transducer, and a temperature probe and the sensing data includes one or more of motion data, temperature data, and pressure data. Preferably, the sensing data includes a unique animal identifier. Preferably, the sensing data includes animal internal digestion system pressure differentials.

Preferably, the host processor analyses the sensing data according to machine learning (ML) or artificial intelligence (AI) techniques on sensing data recorded in a database. Preferably, the host computer establishes cluster data sets to assist identification of eructation events.

Preferably, the host processor performs the data processing according to a calibration method according to a controlled environment with multiple animals with electronic boluses administered. Preferably, the host processor records the total number of eructations from the time the electronic bolus is inserted into an animal, until time of death of the animal or removal from herd. Preferably, the host processor generates an estimate of total gas emitted over a period of time for an individual animal, according to a count of the eructations and characteristics of an animal to estimate the emission rates. Preferably, the host processor generates gas emissions data according to an assumption that eructations of animals of a particular group are repeatable with a standard volume. Preferably, the host processor identifies said groups according to breed, age and sex of the animal.

We also describe a non-transitory data storage medium comprising software code for performing a method of any example when executing on a digital data processor.

DETAILED DESCRIPTION OF THE INVENTION

The invention will be more clearly understood from the following description of some embodiments thereof, given by way of example only with reference to the accompanying drawings in which.

Gas emission from ruminant animals is measured by use of electronic boluses having a digital processor receiving sensing data located in the animals' rumen, specifically the ventral sac (see FIG. 2), and a communication gateway acting as a receiver that routes the data on for processing to a host computer which may be in the Cloud.

The electronic boluses include in various sensing capabilities, primarily sensors for temperature and rumen motility (motion within the rumen) i.e. physical 3D displacement as sensed by an accelerometer. They may also include pressure sensors and pressure differential data may be derived.

In general, the sensors detect activity, which is a general term for movement a ruminant would make while lying, grazing, bulling (mounting other animals), limping, walking to parlour, calving, ruminating and eructating. The types of activity are identified in some examples through the use of Artificial Intelligence (AI) with Machine Learning (ML).

Ruminant animals excrete standard and repeatable volumes of gas due to the biological make-up of the rumen i.e. the chamber that holds gases fills and emits once sufficient pressure is built up. Studies have shown that gas emissions are a highly repeatable phenotype, meaning that once the breed and sex of an animal is known, the amount of greenhouse gases emitted per eructation can accurately be estimated.

Figure 1:
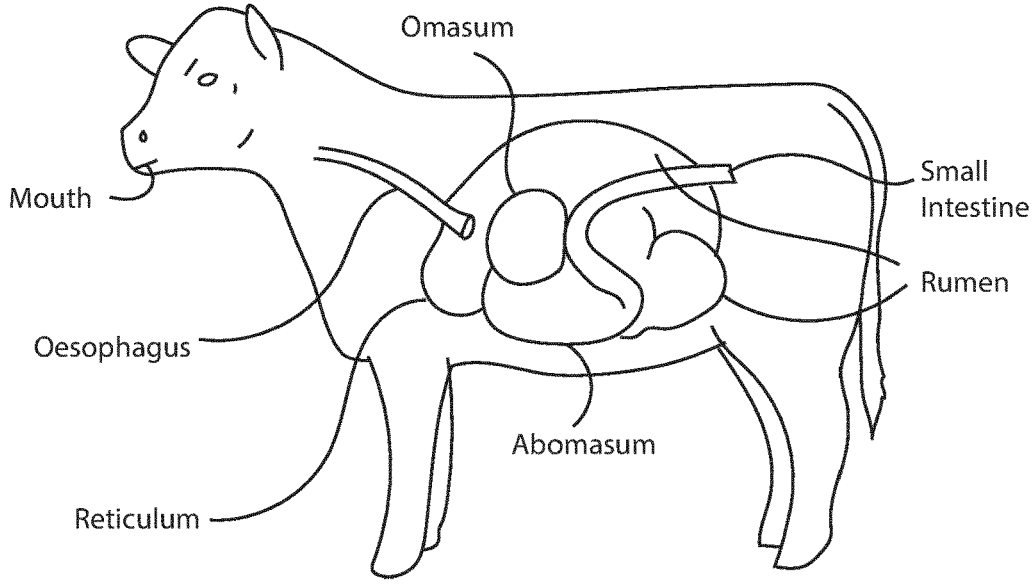
FIGS. 1 and 2 are diagrams illustrating the digestive system anatomy of a cow as relevant to the invention.
Figure 2:
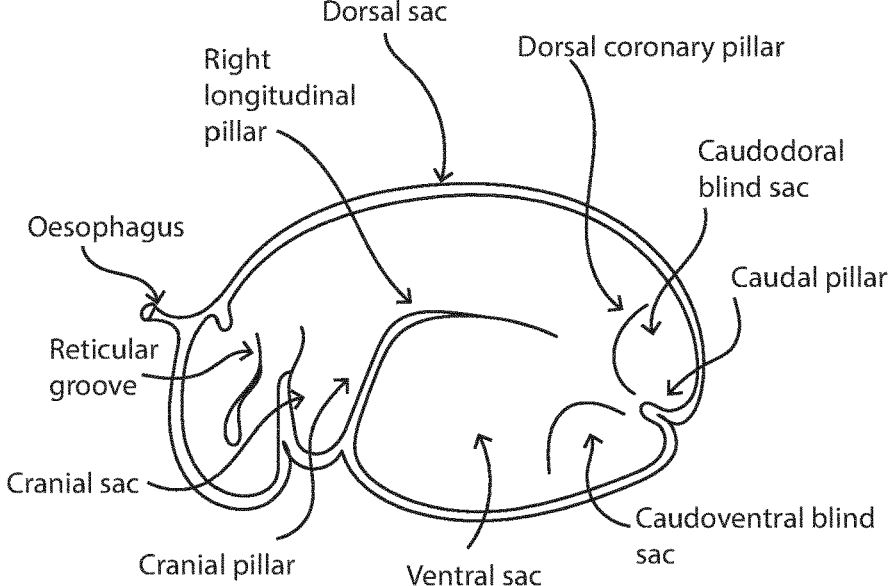

Referring to FIGS. 1 and 2, when a ruminant animal initially consumes feedstuff such as grass, hay, grain or concentrate, the feedstuff resides in the rumen, where bacteria begin to break down the foodstuff, so that it can be digested by the animal.

During rumination, primary and secondary contractions will occur within the rumen, to displace foodstuff and force partially digested foodstuffs back up the oesophagus allowing the animal rechew the foodstuff. Carbon dioxide ($CO_2$) and methane ($CH_4$) are excreted as by-products out the mouth of the animal in the form of an eructation/belch associated to secondary contractions.

Secondary contractions will always follow a primary contraction. In general, a number of one or more primary contractions occur in succession, followed by a secondary contraction which gives rise to an eructation. The associated secondary contractions also have specific motility characteristics, including a contraction and shift in the ventral sac. It is this specific motility that the inserted electronic bolus will detect by utilising an accelerometer sensor.

We describe a method and apparatus for determining greenhouse gas (i.e. CO2 and CH4), emitted by a ruminant. The apparatus has an electronic bolus device inserted into the rumen (see FIG. 2) of the animal. The electronic bolus remains in this location for the lifetime of the animal. Each electronic bolus has a unique identifier, that can be associated with the animal (e.g. link to government assigned animal identification number) once the electronic bolus has been inserted.

A communication gateway processor receives wireless packets of data from the electronic boluses. The gateway will send a confirmation back to the electronic bolus that the packet of data was received. The data is reprocessed by the gateway and sent to a specific computer host which may be in the Cloud. Software running on the host computer interrogates this data using machine learning, to calculate the number of eructations from each animal with an electronic bolus. Further processing of the data by the host computer will be able to estimate the level of greenhouse gas emissions, by associating unique characteristics of the specific animal being monitored.

Figure 3:
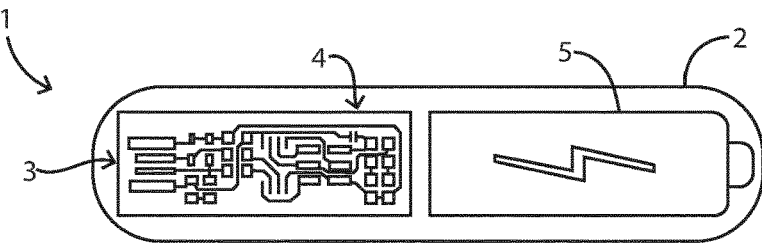
FIG. 3 is a diagram illustrating an electronic bolus of an apparatus for measuring gas emission from ruminants.

Referring to FIG. 3, the electronic bolus 1 is a single cylindrical housing 2 of capsule shape which is 150 mm long and has a diameter of 30 mm, comprising a battery and Printed Circuit Board (PCB) 4. The PCB 4 has a processor, a communication emitter 5, and multiple sensors 3, in this case an accelerometer with a built-in gyroscope and a temperature probe. The battery life of the electronic bolus is in the region of 6 years. The electronic bolus emits packets of data via communication protocols LoRaWAN® or Narrowband-IoT, under a defined time frequency (e.g. every 10 mins) that will be picked up by the communication gateway (in the case of LoRaWAN®>) or mobile communication mast (in the case of Narrowband-IoT). The communication gateway or mast will use high bandwidth networks such as WiFi, Ethernet or Cellular to connect to the Internet and a specified host computer.

The data obtained from the electronic boluses includes some or more of unique identification, body activity, and temperature readings. The data is analysed by software using data processing methods such as Machine Learning or Artificial Intelligence techniques. Once the data is correctly arranged in a hosted database, the processor establishes cluster data sets and identifies eructation events. In other examples the host processor includes pattern recognition software which is executed by the local digital processor on the PCB of the bolus. This greatly reduces the extent of data which needs to be communicated wirelessly, and hence reduces bolus power consumption.

These results are initially validated by identifying eructation events using an alternative external technique for measuring ruminant eructations. This will require setting up a controlled environment with several animals with electronic boluses administered. By analysing the concentrations and variations in the gases excreted by the animal, eructation events are recorded. Through time stamp association the data from the electronic bolus and the alternative technique are correlated, allowing eructation events to be identified through utilising a Machine Learning method.

Figure 4:
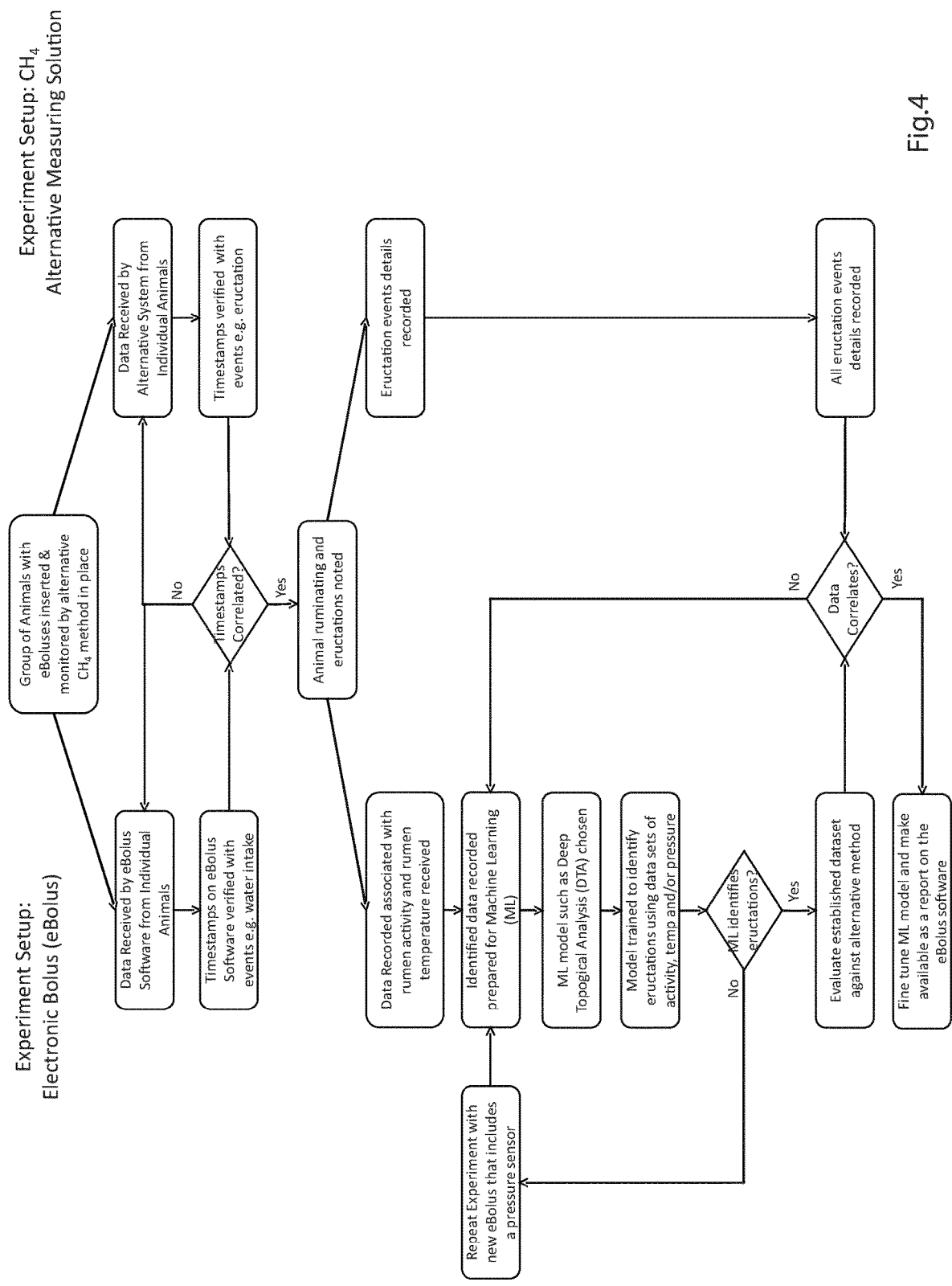
FIGS. 4, 5, and 6 are flow diagrams illustrating operation of the apparatus.

The steps involved and the training the model are illustrated in FIG. 4.

Figure 5:
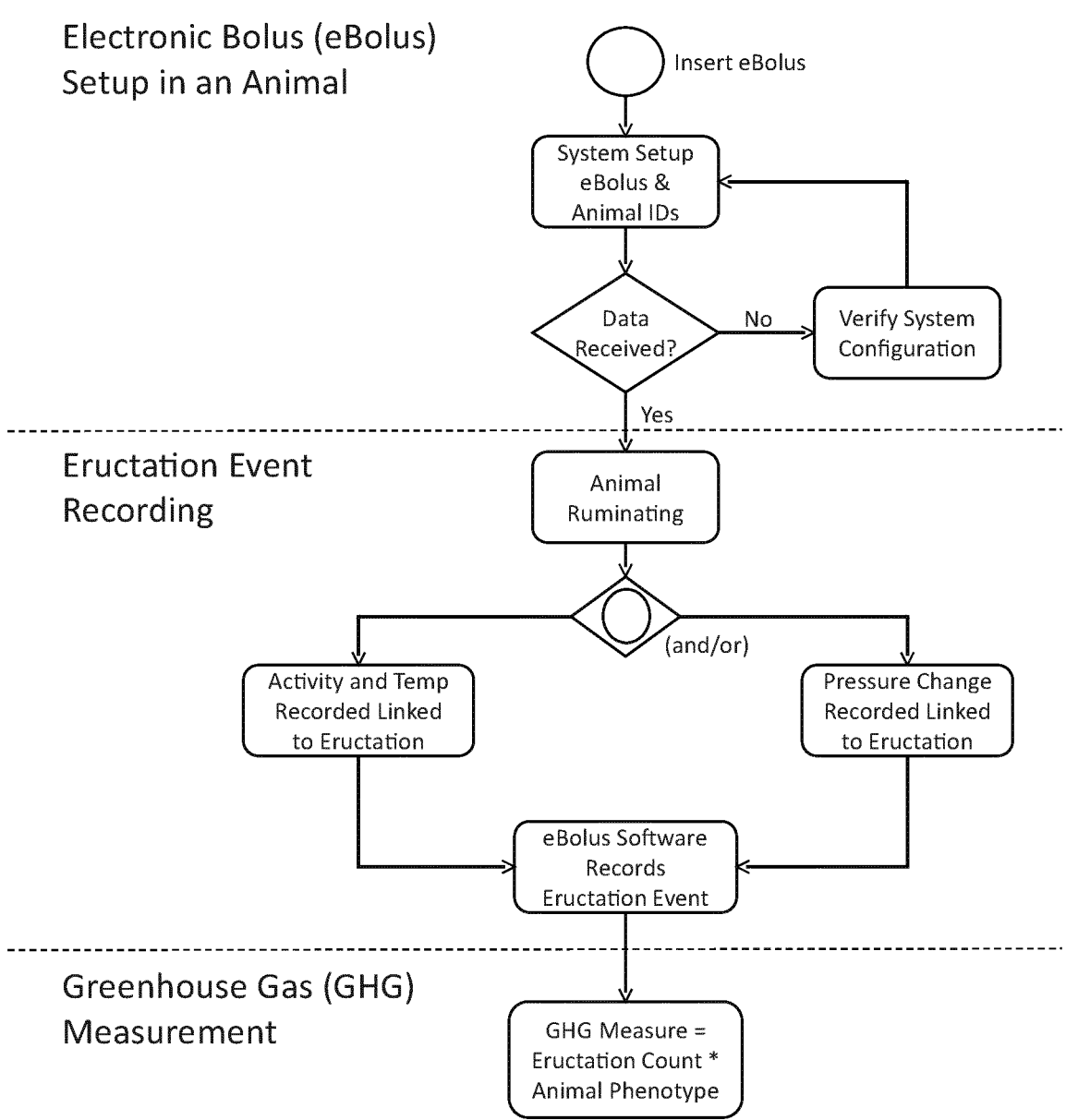

Once the model is initially trained, further operation of the apparatus fine-tunes the accuracy, by running larger scale experiments with just the electronic boluses. Daily known activities will refine the training. For example, eructations from ruminant animals have been shown to follow a diurnal pattern, in that eructations peak after feeding followed by a decline until the next feeding cycle. Herd behaviour and specific animal movements can be identified to establish when the animal is feeding, grazing, drinking, ruminating, resting and so forth. This establishes a predictable analysis of datasets to accurately capture and count eructation events. The key activities involved are illustrated in the flowchart of FIG. 5.

The host processor estimates the total number of eructations from the time the electronic bolus is inserted into an animal, until time of death of the animal or leaving the herd. This provides benefits to farmers, as reductions in eructations will lead to more efficient protein conversion rates for both beef cattle i.e. meat, and dairy cattle i.e. milk. Furthermore, this will inform the farmer which feedstuffs best suit the animal. The data will also allow for accurate estimates of volumes of greenhouse gases produced. This will give the farmer a baseline from which to monitor and potentially reduce the level of greenhouse gases excreted by their animals.

Figure 6:
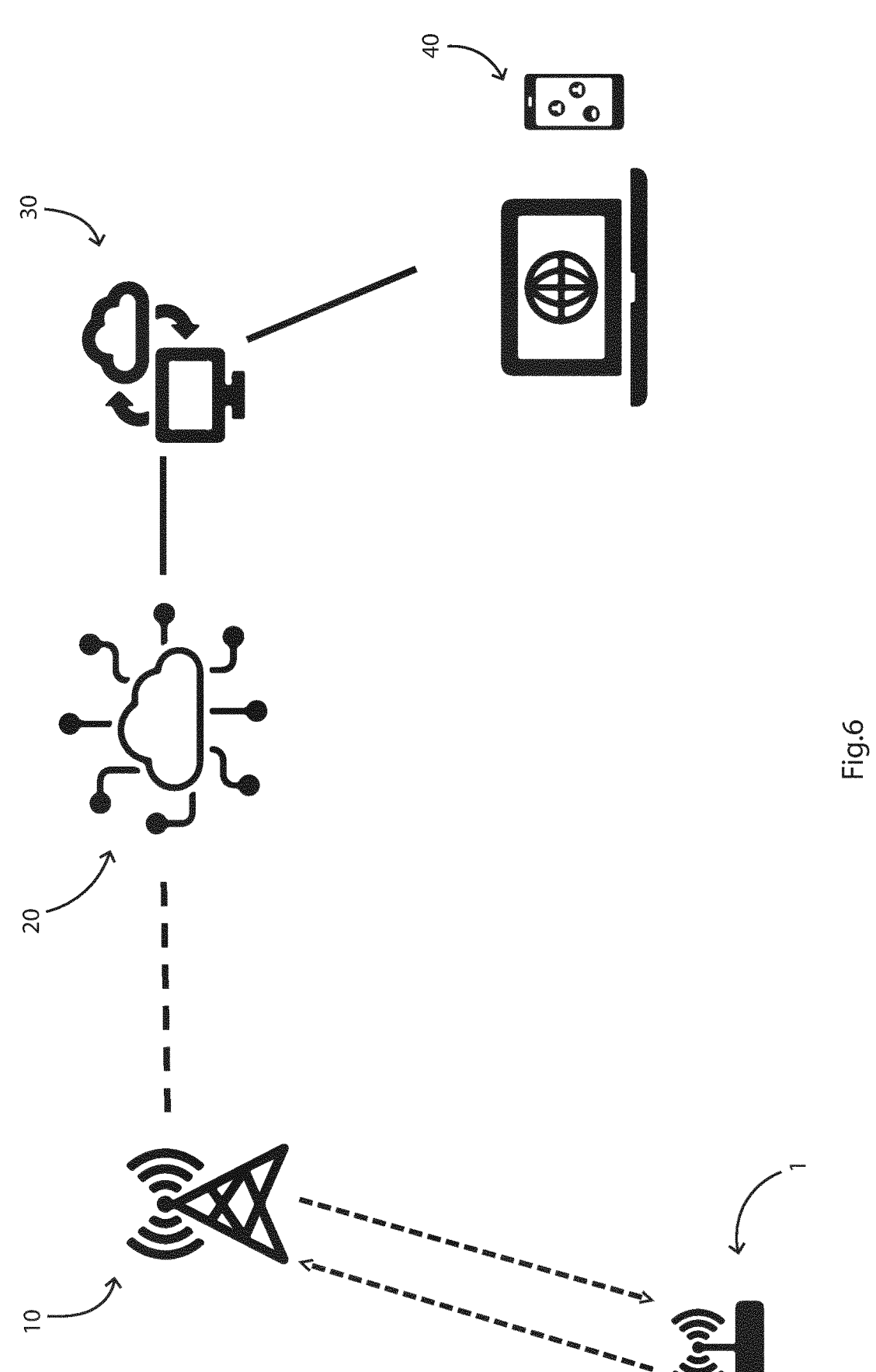

Referring to FIG. 6, the following sets out the steps in more detail. An electronic bolus, "eBolus" 1 is located in an animals' rumen, recording specific sensing data e.g. motility, activity, temperature at set time internals (e.g. every 10 mins), as packets of data. As noted above the eBolus has its own data processor and specific software/firmware programmed onto it. The major sensor output is the eBolus 1 movement as detected by the accelerometer.

Data packets sent from the eBolus 1 are received by a LoRaWAN® Gateway 10, or mobile phone mast for NarrowBand-IoT communication method. The typical range of LoRaWAN is 1 km, but it is up to 10 km for NarrowBand-IoT. There is then backhaul communication with a hosted data centre 20, in one example Microsoft Azure™ which is programmed to sort and store the data. An application server (host computer) 30 receives data from the server 20 and is programmed to interrogate it using machine learning to generate reports that can be made available to users e.g. complete data on a herd of cattle. Software runs on user devices 40 to provide reports on animal health and eructation events. By combining animal identifiers, characteristics and number of eructations, gas emissions are estimated.

Determination of Monitoring Periods

The accelerometer outputs are processed by the host processor to monitor animal body activity to determine in real time periods in which it monitors contractions in the animal's rumen. As noted above, the host processor comprises digital data processors which execute software to process signals from the bolus sensors, and these processors may be located in the bolus and at other external locations.

The software has stored characteristics for accelerometer signals for identifying when the animal is feeding, and to identify activity which typically precedes feeding.

Also, the software is programmed to use stored characteristics to recognise rumination. For example, there will not be drinking activity, and it follows feeding activity. It also determines when there is low body activity and simultaneous rumination activity occurring. It has a stored condition that rumination has particular accelerometer characteristics, and on a temporal scale it must follow immediately after feeding. Hence, while rumination may occur with high body activity, the software is programmed to determine a monitoring period while there is both rumination and low body activity.

The eructations are recorded accurately during each monitoring period. This data is then used to generate an estimate of:

(a) The volume of gas (primarily CH4 and CO2) per eructation, based on the animal sex and phenotype.

(b) The volume of such gases for the monitoring period.

(c) The overall gas emissions for a period such as a 24-hour period or a week, by adjusting the rate for non-monitoring periods by a factor of that during the monitoring periods.

Of course, the recorded emissions data per monitoring period is in itself a very useful metric for comparison across animals and across time periods such as days for a specific animal.

Rumination contractions are monitored during these monitoring periods. This is achieved by, in real time, changing the host local processor settings to: (a) increase the sampling rate for the accelerometer signals, for example to sample the signals every 60 seconds, and (b) increase the sensitivity so that smaller movements which are ignored outside of the monitoring periods are now sampled and processed. Hence, during the monitoring periods smaller accelerometer movements are captured and analyzed in order to determine primary and secondary contractions. This helps to achieve accurate contraction data.

Within a monitoring period, which period is determined in real time, the host processor analyses the accelerometer signals to identify a series of one or more primary contractions and the secondary contraction which follows. The secondary contraction has a level of physical movement of the bolus at a rate of linear acceleration which is a multiple of that during the primary contractions. It is the identified secondary contractions which provide the eructation count, one per secondary contraction.

For example, referring to the table below (Table 1) the software identifies samples in rows 2 to 10 as being indicative of rumination activity with low body activity. Rows 11 to 22 allow the software to identify rumination for some samples (one sample/row per 30 minutes) but there is medium to high activity, and so the time for these samples are not in a monitoring period. Then, the period of rows 23 to 31 is identified as a monitoring period because there is low body activity and rumination is occurring. The period for the row 32 to 44 samples are outside of a monitoring period for the same reasons as that of the rows 11 to 21.

In this table the numbers in the activity columns are numbers of events, each event being a movement greater than a threshold (defined by rate of linear acceleration and/or rotation of the bolus) which is set for each of the Low Activity, High Activity, and Very High Activity categories. Likewise in the second table below (Table 2), but in this case the sensitivity is much greater, and a threshold for a High Activity level event is much lower for the monitoring period contraction monitoring.

TABLE 1

| | A | B | C | D | E | F | G | H | I | J |
|---|---|---|---|---|---|---|---|---|---|---|
| 1 | bolus | cow | eart | Low Activity | High Activity | Very High Activity | createdAt | Body Activity High/Medium/Low | Rumination Yes/No/Null | Rumination Monitoring Yes/No |
| 2 | 888 | 946 | 231 | 3 | 0 | 0 | 2021-07-01T23:59:42.000Z | Low | Yes | Yes |
| 3 | 888 | 946 | 231 | 0 | 0 | 0 | 2021-07-01T23:31:09.000Z | Low | Yes | Yes |
| 4 | 888 | 946 | 231 | 1 | 0 | 0 | 2021-07-01T23:04:48.000Z | Low | Yes | Yes |
| 5 | 888 | 946 | 231 | 0 | 0 | 0 | 2021-07-01T22:34:04.000Z | Low | Yes | Yes |
| 6 | 888 | 946 | 231 | 0 | 0 | 0 | 2021-07-01T22:04:49.000Z | Low | Yes | Yes |
| 7 | 888 | 946 | 231 | 5 | 0 | 0 | 2021-07-01T21:34:05.000Z | Low | Yes | Yes |
| 8 | 888 | 946 | 231 | 0 | 0 | 0 | 2021-07-01T21:03:21.000Z | Low | Yes | Yes |
| 9 | 888 | 946 | 231 | 2 | 0 | 0 | 2021-07-01T20:32:40.000Z | Low | Yes | Yes |
| 10 | 888 | 946 | 231 | 3 | 0 | 0 | 2021-07-01T20:01:56.000Z | Low | Yes | Yes |
| 11 | 888 | 946 | 231 | 1 | 1 | 0 | 2021-07-01T19:31:14.000Z | Low | Yes | No |
| 12 | 888 | 946 | 231 | 2 | 5 | 5 | 2021-07-01T19:00:29.000Z | Medium | Yes | No |
| 13 | 888 | 946 | 231 | 3 | 1 | 0 | 2021-07-01T18:29:48.000Z | Medium | Yes | No |
| 14 | 888 | 946 | 231 | 3 | 3 | 0 | 2021-07-01T17:59:05.000Z | Medium | Yes | No |
| 15 | 888 | 946 | 231 | 5 | 3 | 0 | 2021-07-01T17:28:20.000Z | Medium | Yes | No |
| 16 | 888 | 946 | 231 | 3 | 10 | 0 | 2021-07-01T16:57:39.000Z | Medium | Null | No |
| 17 | 888 | 946 | 231 | 55 | 152 | 104 | 2021-07-01T16:26:55.000Z | High | Null | No |
| 18 | 888 | 946 | 231 | 5 | 11 | 2 | 2021-07-01T15:56:13.000Z | High | Null | No |
| 19 | 888 | 946 | 231 | 2 | 3 | 0 | 2021-07-01T15:25:30.000Z | Medium | Null | No |
| 20 | 888 | 946 | 231 | 5 | 0 | 0 | 2021-07-01T14:54:47.000Z | Medium | Yes | No |
| 21 | 888 | 946 | 231 | 1 | 2 | 0 | 2021-07-01T14:24:04.000Z | Medium | Yes | No |
| 22 | 888 | 946 | 231 | 1 | 2 | 0 | 2021-07-01T13:53:20.000Z | Medium | Yes | No |
| 23 | 888 | 946 | 231 | 3 | 0 | 0 | 2021-07-01T13:22:38.000Z | Medium | Yes | Yes |
| 24 | 888 | 946 | 231 | 0 | 0 | 0 | 2021-07-01T12:51:55.000Z | Low | Yes | Yes |
| 25 | 888 | 946 | 231 | 1 | 0 | 0 | 2021-07-01T12:21:11.000Z | Low | Yes | Yes |
| 26 | 888 | 946 | 231 | 0 | 0 | 0 | 2021-07-01T11:50:29.000Z | Low | No | Yes |
| 27 | 888 | 946 | 231 | 0 | 0 | 0 | 2021-07-01T11:19:45.000Z | Low | Yes | Yes |
| 28 | 888 | 946 | 231 | 1 | 0 | 0 | 2021-07-01T10:49:03.000Z | Low | Yes | Yes |
| 29 | 888 | 946 | 231 | 1 | 0 | 0 | 2021-07-01T10:18:20.000Z | Low | Yes | Yes |
| 30 | 888 | 946 | 231 | 1 | 0 | 0 | 2021-07-01T09:47:37.000Z | Low | Yes | Yes |
| 31 | 888 | 946 | 231 | 0 | 0 | 0 | 2021-07-01T09:16:54.000Z | Low | Yes | Yes |
| 32 | 888 | 946 | 231 | 2 | 0 | 0 | 2021-07-01T08:46:11.000Z | Low | Yes | No |
| 33 | 888 | 946 | 231 | 37 | 80 | 35 | 2021-07-01T08:15:27.000Z | High | Null | No |
| 34 | 888 | 946 | 231 | 3 | 5 | 0 | 2021-07-01T07:44:45.000Z | Medium | Null | No |
| 35 | 888 | 946 | 231 | 0 | 0 | 0 | 2021-07-01T07:14:01.000Z | Medium | Null | No |
| 36 | 888 | 946 | 231 | 0 | 0 | 0 | 2021-07-01T06:43:18.000Z | Medium | Null | No |
| 37 | 888 | 946 | 231 | 4 | 13 | 3 | 2021-07-01T06:12:34.000Z | Medium | Null | No |
| 38 | 888 | 946 | 231 | 2 | 3 | 0 | 2021-07-01T05:41:52.000Z | Medium | Null | No |
| 39 | 888 | 946 | 231 | 30 | 165 | 84 | 2021-07-01T05:11:54.000Z | High | Null | No |

TABLE 1-continued

|     | A   | B   | C   | D | E | F | G                       | H   | I   | J   |
| --- | --- | --- | --- | - | - | - | ----------------------- | --- | --- | --- |
| 40  | 888 | 946 | 231 | 0 | 0 | 0 | 2021-07-01T04:41:10.000Z | Low | Yes | No  |
| 41  | 888 | 946 | 231 | 1 | 1 | 0 | 2021-07-01T04:11:11.000Z | Low | Yes | No  |
| 42  | 888 | 946 | 231 | 2 | 0 | 0 | 2021-07-01T03:40:28.000Z | Low | Yes | No  |
| 43  | 888 | 946 | 231 | 0 | 0 | 0 | 2021-07-01T03:09:44.000Z | Low | No  | No  |
| 44  | 888 | 946 | 231 | 1 | 0 | 0 | 2021-07-01T02:39:47.000Z | Low | No  | No  |
| 45  | 888 | 946 | 231 | 0 | 0 | 0 | 2021-07-01T02:09:03.000Z | Low | No  | Yes |
| 46  | 888 | 946 | 231 | 2 | 0 | 0 | 2021-07-01T01:38:19.000Z | Low | Yes | Yes | sensorLog__2021-07-01 00__00-2021

The following table (Table 2) sets out the recorded data for a monitoring period, in which the sampling rate is only 60 seconds, and the sensitivity is much greater. In this case, the processor is not identifying monitoring periods, rather it is operating in parallel to monitor accelerometer outputs with a much greater sensitivity so that secondary contractions are identified. Depending on the ruminant's phenotype, patterns of numbers of events in each category are used to identify an eructation.

TABLE 2

|    | A       | B     | C      | D           | E             | F                | G                                                            |
| -- | ------- | ----- | ------ | ----------- | ------------- | ---------------- | ------------------------------------------------------------ |
| 1  | bolusID | cowID | eartag | lowActivity | High Activity | veryHighActivity | createdAt                                                    |
| 2  | 888     | 946   | 231    | 4           | 1             | 0                | Tue Jul 20 2021 13:11:02 GMT+0000 (Coordinated Universal Time) |
| 3  | 888     | 946   | 231    | 2           | 1             | 0                | Tue Jul 20 2021 13:10:02 GMT+0000 (Coordinated Universal Time) |
| 4  | 888     | 946   | 231    | 0           | 1             | 0                | Tue Jul 20 2021 13:09:02 GMT+0000 (Coordinated Universal Time) |
| 5  | 888     | 946   | 231    | 3           | 0             | 0                | Tue Jul 20 2021 13:08:02 GMT+0000 (Coordinated Universal Time) |
| 6  | 888     | 946   | 231    | 2           | 1             | 0                | Tue Jul 20 2021 13:07:02 GMT+0000 (Coordinated Universal Time) |
| 7  | 888     | 946   | 231    | 0           | 0             | 0                | Tue Jul 20 2021 13:06:02 GMT+0000 (Coordinated Universal Time) |
| 8  | 888     | 946   | 231    | 4           | 2             | 0                | Tue Jul 20 2021 13:05:02 GMT+0000 (Coordinated Universal Time) |
| 9  | 888     | 946   | 231    | 3           | 0             | 0                | Tue Jul 20 2021 13:04:02 GMT+0000 (Coordinated Universal Time) |
| 10 | 888     | 946   | 231    | 3           | 1             | 0                | Tue Jul 20 2021 13:03:02 GMT+0000 (Coordinated Universal Time) |
| 11 | 888     | 946   | 231    | 1           | 1             | 0                | Tue Jul 20 2021 13:02:02 GMT+0000 (Coordinated Universal Time) |
| 12 | 888     | 946   | 231    | 3           | 0             | 0                | Tue Jul 20 2021 13:01:02 GMT+0000 (Coordinated Universal Time) |
| 13 | 888     | 946   | 231    | 3           | 2             | 0                | Tue Jul 20 2021 13:00:02 GMT+0000 (Coordinated Universal Time) |
| 14 | 888     | 946   | 231    | 1           | 0             | 0                | Tue Jul 20 2021 12:59:02 GMT+0000 (Coordinated Universal Time) |
| 15 | 888     | 946   | 231    | 5           | 1             | 0                | Tue Jul 20 2021 12:58:02 GMT+0000 (Coordinated Universal Time) |
| 16 | 888     | 946   | 231    | 2           | 1             | 0                | Tue Jul 20 2021 12:57:02 GMT+0000 (Coordinated Universal Time) |
| 17 | 888     | 946   | 231    | 3           | 2             | 0                | Tue Jul 20 2021 12:56:02 GMT+0000 (Coordinated Universal Time) |
| 18 | 888     | 946   | 231    | 7           | 1             | 0                | Tue Jul 20 2021 12:55:02 GMT+0000 (Coordinated Universal Time) |
| 19 | 888     | 946   | 231    | 4           | 0             | 0                | Tue Jul 20 2021 12:54:02 GMT+0000 (Coordinated Universal Time) |
| 20 | 888     | 946   | 231    | 2           | 1             | 4                | Tue Jul 20 2021 12:53:02 GMT+0000 (Coordinated Universal Time) |
| 21 | 888     | 946   | 231    | 9           | 1             | 3                | Tue Jul 20 2021 12:52:02 GMT+0000 (Coordinated Universal Time) |
| 22 | 888     | 946   | 231    | 3           | 0             | 0                | Tue Jul 20 2021 12:51:02 GMT+0000 (Coordinated Universal Time) |
| 23 | 888     | 946   | 231    | 1           | 4             | 0                | Tue Jul 20 2021 12:50:02 GMT+0000 (Coordinated Universal Time) |
| 24 | 888     | 946   | 231    | 0           | 0             | 0                | Tue Jul 20 2021 12:49:02 GMT+0000 (Coordinated Universal Time) |
| 25 | 888     | 946   | 231    | 2           | 0             | 0                | Tue Jul 20 2021 12:48:02 GMT+0000 (Coordinated Universal Time) |
| 26 | 888     | 946   | 231    | 2           | 1             | 0                | Tue Jul 20 2021 12:47:02 GMT+0000 (Coordinated Universal Time) |
| 27 | 888     | 946   | 231    | 5           | 0             | 0                | Tue Jul 20 2021 12:46:02 GMT+0000 (Coordinated Universal Time) |
| 28 | 888     | 946   | 231    | 5           | 4             | 5                | Tue Jul 20 2021 12:45:02 GMT+0000 (Coordinated Universal Time) |

TABLE 2-continued

| | A | B | C | D | E | F | G |
|---|---|---|---|---|---|---|---|
| 29 | 888 | 946 | 231 | 1 | 0 | 0 | Tue Jul 20 2021 12:44:02 GMT+0000 (Coordinated Universal Time) |
| 30 | 888 | 946 | 231 | 3 | 0 | 0 | Tue Jul 20 2021 12:43:02 GMT+0000 (Coordinated Universal Time) |
| 31 | 888 | 946 | 231 | 5 | 4 | 0 | Tue Jul 20 2021 12:42:02 GMT+0000 (Coordinated Universal Time) |
| 32 | 888 | 946 | 231 | 2 | 1 | 0 | Tue Jul 20 2021 12:41:02 GMT+0000 (Coordinated Universal Time) |
| 33 | 888 | 946 | 231 | 0 | 0 | 0 | Tue Jul 20 2021 12:40:02 GMT+0000 (Coordinated Universal Time) |
| 34 | 888 | 946 | 231 | 3 | 2 | 0 | Tue Jul 20 2021 12:39:02 GMT+0000 (Coordinated Universal Time) |
| 35 | 888 | 946 | 231 | 1 | 0 | 0 | Tue Jul 20 2021 12:38:02 GMT+0000 (Coordinated Universal Time) |
| 36 | 888 | 946 | 231 | 2 | 0 | 0 | Tue Jul 20 2021 12:37:02 GMT+0000 (Coordinated Universal Time) |
| 37 | 888 | 946 | 231 | 0 | 0 | 0 | Tue Jul 20 2021 12:36:02 GMT+0000 (Coordinated Universal Time) |
| 38 | 888 | 946 | 231 | 3 | 1 | 0 | Tue Jul 20 2021 12:35:02 GMT+0000 (Coordinated Universal Time) |
| 39 | 888 | 946 | 231 | 1 | 5 | 0 | Tue Jul 20 2021 12:34:02 GMT+0000 (Coordinated Universal Time) |
| 40 | 888 | 946 | 231 | 0 | 0 | 0 | Tue Jul 20 2021 12:33:02 GMT+0000 (Coordinated Universal Time) |
| 41 | 888 | 946 | 231 | 4 | 0 | 0 | Tue Jul 20 2021 12:32:02 GMT+0000 (Coordinated Universal Time) |
| 42 | 888 | 946 | 231 | 0 | 2 | 0 | Tue Jul 20 2021 12:31:02 GMT+0000 (Coordinated Universal Time) |
| 43 | 888 | 946 | 231 | 1 | 0 | 0 | Tue Jul 20 2021 12:30:02 GMT+0000 (Coordinated Universal Time) |
| 44 | 888 | 946 | 231 | 2 | 2 | 0 | Tue Jul 20 2021 12:29:02 GMT+0000 (Coordinated Universal Time) |
| 45 | 888 | 946 | 231 | 1 | 4 | 0 | Tue Jul 20 2021 12:28:02 GMT+0000 (Coordinated Universal Time) |
| 46 | 888 | 946 | 231 | 0 | 0 | 0 | Tue Jul 20 2021 12:27:02 GMT+0000 (Coordinated Universal Time) |
| 47 | 888 | 946 | 231 | 3 | 3 | 0 | Tue Jul 20 2021 12:26:02 GMT+0000 (Coordinated Universal Time) |
| 48 | 888 | 946 | 231 | 2 | 1 | 1 | Tue Jul 20 2021 12:25:02 GMT+0000 (Coordinated Universal Time) |
| 49 | 888 | 946 | 231 | 0 | 1 | 0 | Tue Jul 20 2021 12:24:02 GMT+0000 (Coordinated Universal Time) |
| 50 | 888 | 946 | 231 | 3 | 0 | 0 | Tue Jul 20 2021 12:23:02 GMT+0000 (Coordinated Universal Time) |
| 51 | 888 | 946 | 231 | 2 | 1 | 1 | Tue Jul 20 2021 12:22:02 GMT+0000 (Coordinated Universal Time) |
| 52 | 888 | 946 | 231 | 0 | 1 | 0 | Tue Jul 20 2021 12:21:02 GMT+0000 (Coordinated Universal Time) |
| 53 | 888 | 946 | 231 | 4 | 1 | 0 | Tue Jul 20 2021 12:20:02 GMT+0000 (Coordinated Universal Time) |
| 54 | 888 | 946 | 231 | 2 | 2 | 0 | Tue Jul 20 2021 12:19:02 GMT+0000 (Coordinated Universal Time) |
| 55 | 888 | 946 | 231 | 5 | 3 | 0 | Tue Jul 20 2021 12:18:02 GMT+0000 (Coordinated Universal Time) |
| 56 | 888 | 946 | 231 | 2 | 0 | 0 | Tue Jul 20 2021 12:17:02 GMT+0000 (Coordinated Universal Time) |
| 57 | 888 | 946 | 231 | 3 | 2 | 0 | Tue Jul 20 2021 12:16:02 GMT+0000 (Coordinated Universal Time) |
| 58 | 888 | 946 | 231 | 3 | 1 | 0 | Tue Jul 20 2021 12:15:02 GMT+0000 (Coordinated Universal Time) |
| 59 | 888 | 946 | 231 | 1 | 5 | 0 | Tue Jul 20 2021 12:14:02 GMT+0000 (Coordinated Universal Time) |
| 60 | 888 | 946 | 231 | 0 | 0 | 0 | Tue Jul 20 2021 12:13:32 GMT+0000 (Coordinated Universal Time) |
| 61 | 888 | 946 | 231 | 2 | 0 | 0 | Tue Jul 20 2021 12:12:02 GMT+0000 (Coordinated Universal Time) | sensorLog__2021-07-20 05__00-2021

In other aspects, edge computing machine learning (ML) techniques applied on measured temperature and rumen activity data (6-axis acceleration/gyro) can distinguish with higher than 80% to 95% probability between rumination, eructating, drinking, and sleeping activities. There may be generation of an ML decision tree based on offline learning/ generation techniques, supported by previous big data collection.

Once a monitoring period has been identified, both primary and secondary contractions patterns can be established, by increasing the sensitivity level and sampling frequency on the accelerometer. In some examples, an ML tree can be operated at higher frequencies only in the active (monitoring) periods, thus saving battery power in other periods, for example sleep mode.

As the animal typically is at rest during this period, larger activity movement are minimised, therefore reducing the noise factor in pattern recognition.

The bolus may have locally within its housing a System-On-Chip (SoC) MEMS (micro electromechanical system) accelerometer with built-in decision tree and signal processing. In this case a pre-generated algorithm can be operated in edge computing topology, thus saving communication (data) plan, battery life and complexity of system operation.

The ML algorithm operates on a low power and on a high frequency sampling mode in monitoring periods will detect eructation events, thus predicting the emission of greenhouse gases with excellent precision.

Advantages

There is an inverse relationship between low eructation rates and feed conversion i.e. the lower the methane emission the higher the food conversion (grass or concentrate). Identifying these animals through measurement and breeding from them accordingly will give a major financial benefit to the farmer.

The dairy sector is expected to benefit greatest from reductions in methane from herds of cows. The Economic Breeding Index (EBI) is the current standard method of evaluating the genetic merit of any dairy herd and thus the overall financial value of the herd. It is envisaged that methane emissions will be a new criterion in EBI "Hoof-Print", therefore the measurement of the invention system will have major value as it measures the feed conversion co-relationship. Also, it is envisaged that the system of the invention providing measurement of CH4 on a continuous basis will be part of the Quality Management Systems (QMS) for farms, milk and beef processing companies. This will be very important for sustainability credentials of certain farming methods.

Early intervention due to overall health monitoring will lead to less dependence on antibiotics, which aligns with regulatory incentives and cost of deploying the antibiotics.

The invention provides a mechanism for accurate estimation of greenhouse emissions from ruminants on a farm, providing data for farm audits and helping in making decisions on farm planning with sustainability being a key factor. It, in effect, provides a quantitative determination of ruminant emissions.

It is envisaged that the monitoring periods may be extended by changing threshold settings, and a user may control this by changing profile settings. For example, such changes may be according to audit requirements.

The invention is not limited to the embodiments described but may be varied in construction and detail. For example, the host processor and the gateway processor may be combined in the one physical system.

The invention claimed is:

1. An apparatus for measuring gas emissions from ruminant animals, the apparatus comprising:
   at least one electronic bolus adapted to be internally resident in an animal and to emit sensed data wirelessly, each bolus comprising a housing containing a power supply, at least one sensor including an accelerometer, a sensor drive and data capture circuit, and a wireless signal interface for transmitting the sensing data and an animal unique identifier,
   a gateway configured to receive the sensing data,
   a host processor to process the sensed data to generate emissions data,
   wherein the sensed data includes extent of activity provided by the accelerometer as movement of the bolus within an animal, and the host processor is configured to use said activity data to identify eructations and to generate an estimate of total gas emitted over a period of time for an individual animal according to a count of the detected eructations and characteristics of an animal to estimate the emission rates, and
   wherein the host processor is configured to:
   analyse the sensed data according to machine learning (ML) or artificial intelligence (AI) techniques,
   establish cluster data sets to assist identification of eructation events, and to perform the data processing according to a calibration method according to a controlled environment with multiple animals with electronic boluses administered, and to record or estimate the total number of eructations from the time an electronic bolus is administered to an animal, until time of death of the animal or removal from a herd.

2. The apparatus as claimed in claim 1, wherein at least some electronic boluses comprise a plurality of sensors, and wherein the sensors of at least some electronic boluses comprise a temperature probe.

3. The apparatus as claimed in claim 1, wherein at least some electronic boluses comprise a plurality of sensors, and wherein the sensors include a pressure sensor and the sensed data includes animal rumination pressure differentials.

4. The apparatus as claimed in claim 1, wherein at least some electronic boluses comprise a plurality of sensors, and wherein the sensors include a temperature sensor and the sensed data includes temperature readings, and the host processor is configured to use said temperature readings to identify animal behaviour to assist with identifying eructations.

5. An apparatus for measuring gas emissions from ruminant animals, the apparatus comprising:
   at least one electronic bolus adapted to be internally resident in an animal and to emit sensed data wirelessly, each bolus comprising a housing containing a power supply, at least one sensor including an accelerometer, a sensor drive and data capture circuit, and a wireless signal interface for transmitting the sensing data and an animal unique identifier,
   a gateway configured to receive the sensing data, and
   a host processor to process the sensed data to generate emissions data,
   wherein the sensed data includes extent of activity provided by the accelerometer as movement of the bolus within an animal, and the host processor is configured to use said activity data to identify eructations and to generate an estimate of total gas emitted over a period of time for an individual animal according to a count of the detected eructations and characteristics of an animal to estimate the emission rates, and
   wherein the host processor is configured to:
   monitor, according to accelerometer-originating sensed data, animal body activity to determine in real time monitoring periods in which it monitors with increased sensitivity contractions in an animal's rumen, and to monitor rumination primary and secondary contractions during said monitoring periods, and to identify a secondary contraction as representative of an eructation.

6. The apparatus as claimed in claim 5, wherein the host processor is configured to generate gas emissions data according to an assumption that eructations of animals of a particular group are repeatable with a standard volume, and wherein the host processor is configured to identify said groups according to breed, age and sex of the animal.

7. The apparatus as claimed in claim 5, wherein the host processor is configured to:

monitor, according to accelerometer-originating sensed data, animal body activity to determine in real time monitoring periods in which it monitors with increased sensitivity contractions in an animal's rumen, and to monitor rumination primary and secondary contractions during said monitoring periods, and to identify a secondary contraction as representative of an eructation, determine a monitoring period as a period when both body activity is below a threshold and also rumination is taking place, and to identify rumination according to a pattern of body activity, drinking behaviour, and a condition that rumination follows immediately after feeding.

8. The apparatus as claimed in claim 5, wherein the host processor is configured to:

monitor, according to accelerometer-originating sensed data, animal body activity to determine in real time monitoring periods in which it monitors with increased sensitivity contractions in an animal's rumen, and to monitor rumination primary and secondary contractions during said monitoring periods, and to identify a secondary contraction as representative of an eructation wherein the host processor is configured to store characteristics of accelerometer signals for identifying when the animal is feeding, and to identify animal body activities and drinking behaviour as being indicative of feeding behaviour, and to identify animal drinking behaviour by monitoring temperature at the bolus, in which temporary temperature drops indicate intake of water.

9. The apparatus as claimed in claim 5, wherein the host processor is configured to:

monitor, according to accelerometer-originating sensed data, animal body activity to determine in real time monitoring periods in which it monitors with increased sensitivity contractions in an animal's rumen, and monitor rumination primary and secondary contractions during said monitoring periods, and to identify a secondary contraction as representative of an eructation, and to in real time, change the host local processor settings during a monitoring period to:

(a) increase the sampling rate for the accelerometer signals, and (b) increase the sensitivity of response to the accelerometer signals so that smaller movements than those outside of a monitoring period are sampled and processed.

10. An apparatus as claimed in claim 5, wherein the host processor is configured to:

monitor, according to accelerometer-originating sensed data, animal body activity to determine in real time monitoring periods in which it monitors with increased sensitivity contractions in an animal's rumen, and monitor rumination primary and secondary contractions during said monitoring periods, and to identify a secondary contraction as representative of an eructation wherein the processor is configured to identify a secondary contraction on the conditions of: (i) there being a determined monitoring period at present, (ii) there being a series of one or more primary contractions and a secondary contraction follows said series, and (iii) motion amplitude of the accelerometer is greater for a secondary contraction than for the primary contraction or contractions.

11. A method performed by an apparatus for estimating gas emissions of a ruminant animal, the apparatus comprising:

at least one electronic bolus adapted to be internally resident in an animal and to emit sensed data wirelessly, each bolus comprising a housing containing a power supply, at least one sensor including an accelerometer, a sensor drive and data capture circuit, and a wireless signal interface for transmitting the sensing data and an animal unique identifier, a gateway configured to receive the sensing data, and a host processor to process the sensed data to generate emissions data, wherein the sensed data includes extent of activity provided by the accelerometer as movement of the bolus within an animal, and the host processor is configured to use said activity data to identify eructations and to generate an estimate of total gas emitted over a period of time for an individual animal according to a count of the detected eructations and characteristics of an animal to estimate the emission rates;

wherein the method comprising the host processor processing sensing signals from a bolus in the animal to determine activity data according to movement of the bolus, and using said activity data to identify eructations, and generating an estimate of total gas emitted over a period of time for an individual animal according to a count of the detected eructations and characteristics of an animal, and wherein the host processor monitors, according to accelerometer signals, animal body activity to determine in real time monitoring periods in which it monitors with increased sensitivity contractions in an animal's rumen, and monitors rumination primary and secondary contractions during said monitoring periods, and identifies a secondary contraction as representative of an eructation.

12. The method as claimed in claim 11, wherein the host processor generates gas emissions data according to an assumption that eructations of animals of a particular group are repeatable with a standard volume, and identifies said groups according to breed, age and sex of the animal.

13. A method performed by an apparatus for estimating gas emissions of a ruminant animal, the apparatus comprising:

at least one electronic bolus adapted to be internally resident in an animal and to emit sensed data wirelessly, each bolus comprising a housing containing a power supply, at least one sensor including an accelerometer, a sensor drive and data capture circuit, and a wireless signal interface for transmitting the sensing data and an animal unique identifier, a gateway configured to receive the sensing data, and a host processor to process the sensed data to generate emissions data, wherein the sensed data includes extent of activity provided by the accelerometer as movement of the bolus within an animal, and the host processor is configured to use said activity data to identify eructations and to generate an estimate of total gas emitted over a period of time for an individual animal according to a count of the detected eructations and characteristics of an animal to estimate the emission rates;

wherein the method comprising the host processor processing sensing signals from a bolus in the animal to determine activity data according to movement of the bolus, and using said activity data to identify eructations, and generating an estimate of total gas emitted over a period of time for an individual animal according to a count of the detected eructations and characteristics of an animal, and wherein the processor determines a monitoring period as a period when body activity is below a threshold and rumination is taking place, identifies body activity primarily according to linear acceleration and/or rotation of the accelerometer, and identifies rumination according to a pattern of body activity, drinking behaviour, and a condition that rumination follows immediately after feeding.

14. The method as claimed in claim 13, wherein the processor determines a monitoring period as a period when body activity is below a threshold and rumination is taking place, identifies body activity primarily according to linear acceleration and/or rotation of the accelerometer, and identifies rumination according to a pattern of body activity, drinking behaviour, and a condition that rumination follows immediately after feeding, and wherein the host processor stores characteristics of accelerometer signals for identifying when the animal is feeding.

15. The method as claimed in claim 13, wherein the processor determines a monitoring period as a period when body activity is below a threshold and rumination is taking place, identifies body activity primarily according to linear acceleration and/or rotation of the accelerometer, and identifies rumination according to a pattern of body activity, drinking behaviour, and a condition that rumination follows immediately after feeding, and wherein the host processor identifies animal body activities and drinking behaviours as being indicative of feeding behaviour.

16. The method as claimed in claim 13, wherein the processor determines a monitoring period as a period when body activity is below a threshold and rumination is taking place, identifies body activity primarily according to linear acceleration and/or rotation of the accelerometer, and identifies rumination according to a pattern of body activity, drinking behaviour, and a condition that rumination follows immediately after feeding, and wherein the host processor identifies animal drinking behaviour by monitoring temperature at the bolus, in which temporary temperature drops indicate intake of water.

17. A method as claimed in claim 13, wherein the processor determines a monitoring period as a period when body activity is below a threshold and rumination is taking place, identifies body activity primarily according to linear acceleration and/or rotation of the accelerometer, and identifies rumination according to a pattern of body activity, drinking behaviour, and a condition that rumination follows immediately after feeding, and wherein the processor, in real time, changes the bolus and host processor settings to: (a) increase the sampling rate for the accelerometer signals, and (b) increase the sensitivity of response to the accelerometer signals so that smaller movements than those outside of a monitoring period are sampled and processed.

18. The method as claimed in claim 13, wherein the processor identifies a secondary contraction on the conditions of: (i) there being a determined monitoring period at present, (ii) there being a series of one or more primary contractions and a secondary contraction follows said series, and (iii) motion amplitude of the accelerometer is greater for a secondary contraction than for the primary contraction or contractions.

19. A non-transitory data storage medium comprising software code for performing a method of claim 11 when executing on a digital data processor.

* * * * *